(12) United States Patent
Stiehl et al.

(10) Patent No.: US 6,736,553 B1
(45) Date of Patent: May 18, 2004

(54) VCSEL ARRAY OPTICAL SUBASSEMBLY MODULE WITH ALIGNMENT MECHANISM

(75) Inventors: Mark Stiehl, Lafayette, CO (US); Michael L. Tartaglia, Thornton, CO (US); Carl Embry, Boulder, CO (US); Michael Dudek, Longmont, CO (US); Timothy Bingaman, Thornton, CO (US); Allen Tracy, Longmont, CO (US); Mark Eginton, Erie, CO (US); Dale Isaacson, Idaho Springs, CO (US); Craig Mynatt, San Diego, CA (US)

(73) Assignee: Optical Communication Products, Inc., Woodland Hills, CA (US)

( * ) Notice: Subject to any disclaimer, the term of this patent is extended or adjusted under 35 U.S.C. 154(b) by 56 days.

(21) Appl. No.: 10/044,390

(22) Filed: Jan. 11, 2002

Related U.S. Application Data

(60) Provisional application No. 60/261,223, filed on Jan. 12, 2001.

(51) Int. Cl.[7] ............................ G02B 6/42; G02B 6/43
(52) U.S. Cl. .......................... 385/89; 385/92; 385/93
(58) Field of Search ................................ 385/89–94

(56) References Cited

U.S. PATENT DOCUMENTS

| | | | | |
|---|---|---|---|---|
| 5,940,562 A | * | 8/1999 | Henson et al. | 385/92 |
| 6,056,448 A | * | 5/2000 | Sauter et al. | 385/92 |
| 6,081,638 A | * | 6/2000 | Zhou | 385/88 |
| 6,243,508 B1 | * | 6/2001 | Jewell et al. | 385/93 |

* cited by examiner

Primary Examiner—Akm Enayet Ullah
Assistant Examiner—Omar Rojas
(74) Attorney, Agent, or Firm—Barlow, Josephs & Holmes, Ltd.

(57) ABSTRACT

A method and apparatus for coupling light from an array of optoelectronic devices to a corresponding array of fibers contained in a fiber optic ferrule is disclosed. The fibers may be single-mode or multi-mode optical fibers. The method includes fixing the fiber optic ferrule to the optical subassembly (OSA) base upon which the array of optoelectronic devices will be affixed, aligning the array of optoelectronic devices to the corresponding array of fibers, then securing the array of optoelectronic devices to the OSA base. In one embodiment, the module includes an optical subassembly module housing a linear array of 1300 nm VCSELs or photodetectors, spaced apart at a 250 micron pitch to correspond to the spacing of optical fibers in a conventional MT ferrule. The array of optoelectronic devices is mounted on a substrate assembly that includes a weldable surface and one or more photodetectors for automatic power control. After the components are aligned, the substrate assembly is affixed to the OSA base by epoxying or welding. The material within the substrate assembly is transparent to the emitted light or includes a notch or hole that allows light to pass through, in order to facilitate the integral placement of the monitor within the substrate assembly and beneath the material.

10 Claims, 15 Drawing Sheets

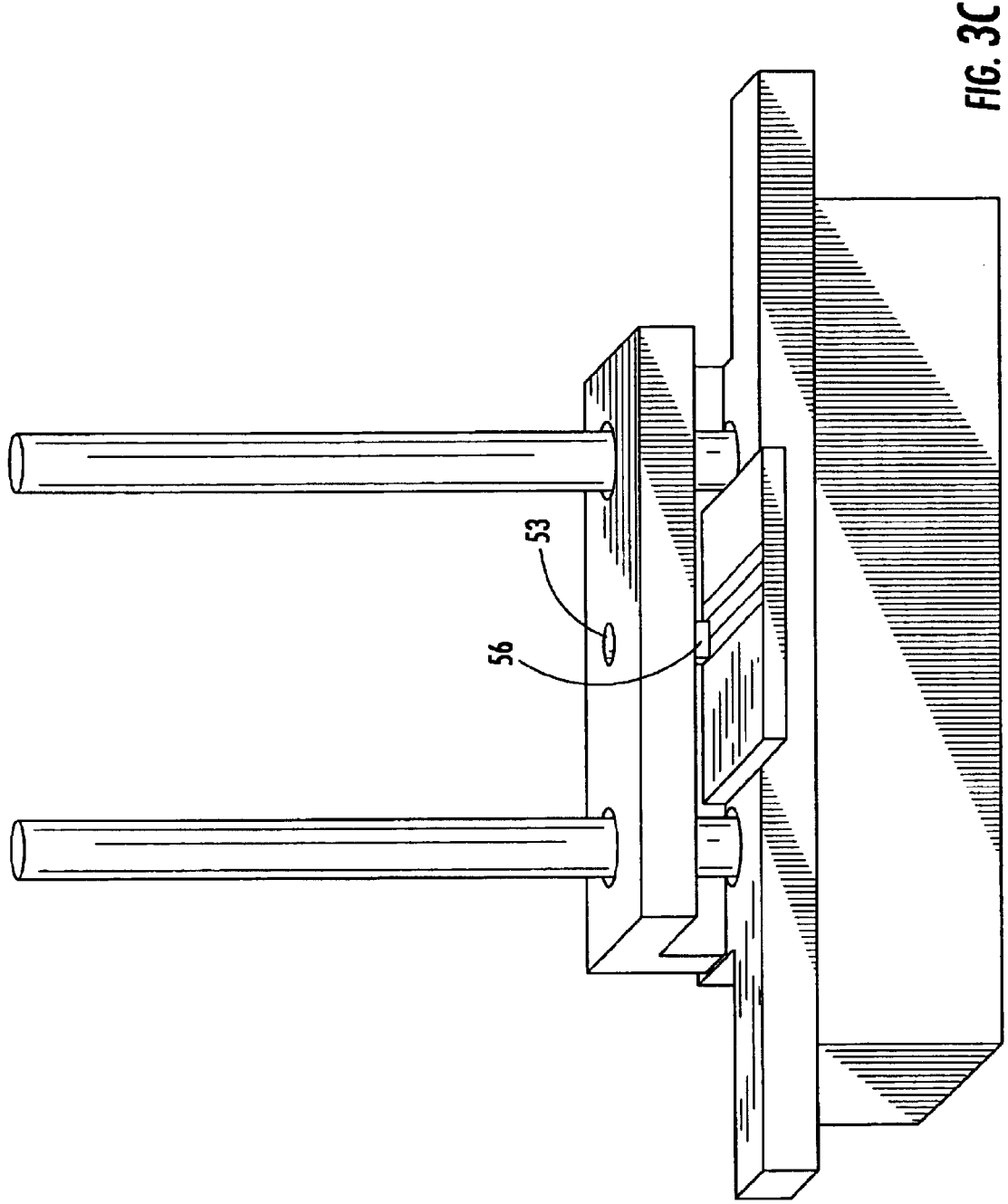

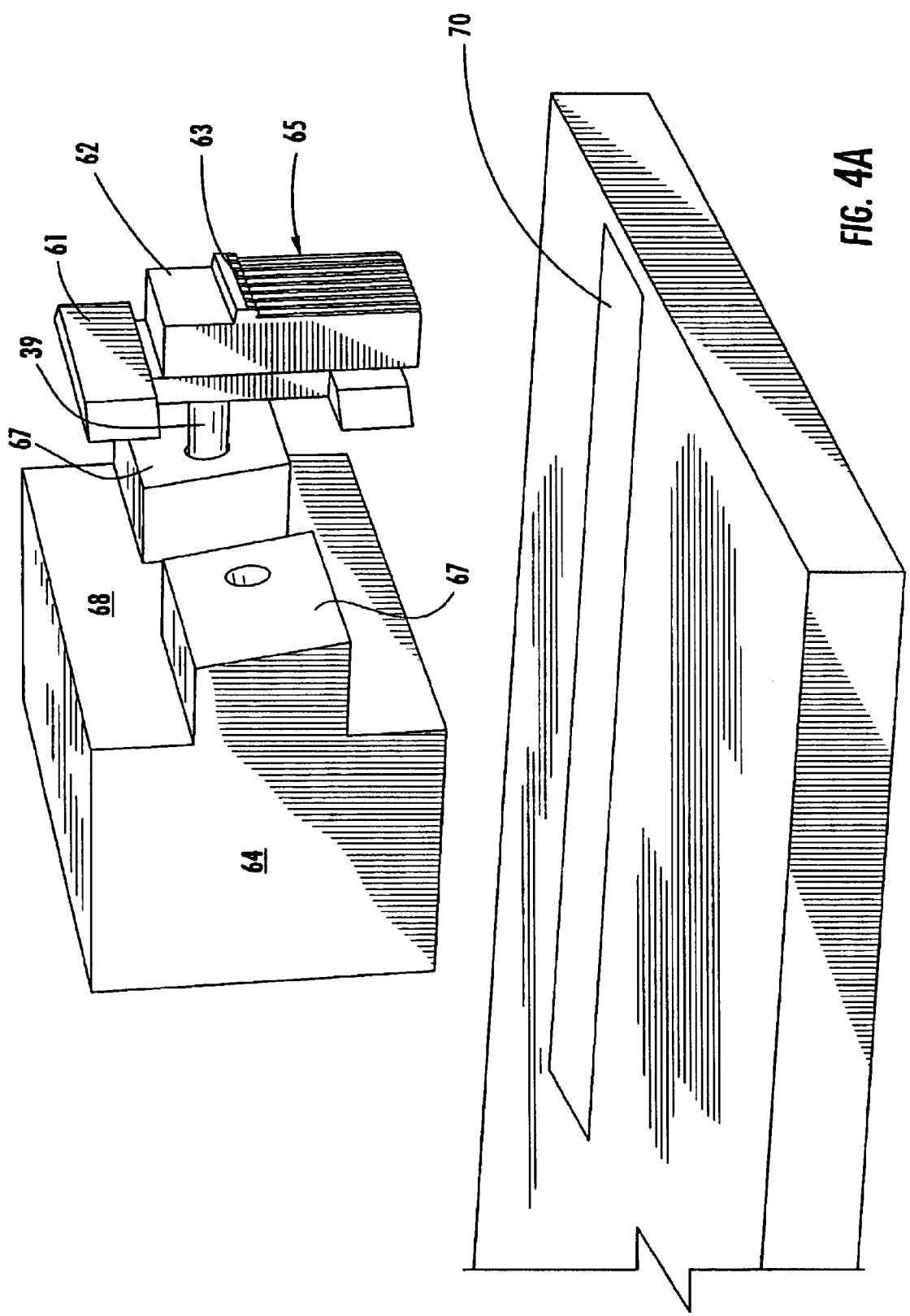

VCSEL ARRAY OPTICAL SUBASSEMBLY MODULE WITH ALIGNMENT MECHANISM

CROSS-REFERENCE TO RELATED APPLICATIONS

The present application claims priority of U.S. provisional application No. 60/261,223, filed Jan. 12, 2001, the contents of which are hereby incorporated by reference. The present application discloses subject matter related to the subject matter disclosed in U.S. patent application Ser. No. 10/012, 217, the contents of which are hereby incorporated by reference.

FIELD OF THE INVENTION

The present invention relates to fiber optic modules, and more particularly, to a module for housing an array of optoelectronic devices and a method for coupling light between the devices and fibers contained within a conventional fiber optic ferrule.

BACKGROUND

Fiber optic technology is widely utilized in today's telecommunication and data communication network. One important aspect of this technology is the interconnection of optical fibers to optoelectronic devices such as semiconductor lasers and photodetectors, wherein the optoelectronic devices either receive optical radiation from the optical fibers or the optoelectronic devices emit optical radiation into the fibers. A good optical interconnect between an optical fiber and an optoelectronic device preferably provides high coupling efficiency, ease of assembly, and low cost manufacturing.

Conventional single-mode fiber optic modules are pigtailed devices, in which the optoelectronic device to fiber connection is completely contained within the module. Most modules are also hermetically sealed and are serial links, in which one transmit and/or one receive channel are contained within the module. Pigtailing and hermetically sealing, however, result in relatively high costs and serial links require a large amount of board space per optical channel in switching boxes.

In the data communications market, there are also numerous multi-mode fiber optic modules available. The majority of these modules do not have pigtails and are not hermetically sealed, except for the optoelectronic device itself. Non-pigtailed, non-hermetically sealed modules are known as connectorized modules. These connectorized modules are generally smaller and less expensive. The multi-mode fibers are generally 50 or 62.5 microns in core diameter, and therefore provide for easy alignment of the fiber to the optoelectronic device. Conventional single-mode fibers are 9 microns in diameter and are therefore more difficult to align and present greater challenges in forming connectorized modules.

Optoelectronic device array modules are available in the data communications market, but to date are limited to 850 nm vertical cavity surface emitting laser (VCSEL) array modules. An array transmitter is desirable because it provides a very high number of optical channels per inch of board space in the switching box. Thus far, these array modules are limited to multi-mode applications and therefore are limited in transmission distance. It would be desirable to have an array of long wave single mode VCSELs that provides the benefits of increased density of optical channels for a given board space and increased transmission distance.

The output optical power of VCSELs sometimes fluctuates due to changing environment such as temperature variation, aging behavior of the VCSELs, or circuit property drift in the laser drive circuitry. In a conventional single or serial transmission link, a photodetector receives a proportional fraction of the laser light emitted from the laser, and delivers a feedback signal to the laser drive circuit to correct the laser output optical power fluctuation. However, this method may be inefficient for an optical interconnect system involving an array of VCSELs, because it would require a photodetector and a feedback circuit for each and every one of the VCSELs.

SUMMARY OF THE INVENTION

In an exemplary embodiment, the present invention provides a VCSEL array within an optical subassembly module with an alignment.a connectorized array of VCSELs with high coupling efficiency includes a photodetector capable of monitoring the representative optical output of the VCSELs.

In particular, the present invention provides a method and apparatus for coupling light from an array of optoelectronic devices to a corresponding array of fibers contained in a conventional fiber optic ferrule. The fibers may be single-mode or multi-mode optical fibers. The method includes fixing the conventional fiber optic ferrule to the optical subassembly (OSA) base upon which the array of optoelectronic devices will be affixed, aligning the array of optoelectronic devices to the corresponding array of fibers, then securing the array of optoelectronic devices to the OSA base. A connectorized, nonpigtailed module is produced.

In an exemplary embodiment, the module includes an optical subassembly module housing a linear array of 1300 nm VCSELs or photodetectors, spaced apart at a 250 micron pitch, which corresponds to the spacing of optical fibers in a conventional MT ferrule. The substrate subassembly includes a lower weldable surface and the OSA base is formed of a weldable metal. After the components are aligned by maneuvering the components relative to one another, the substrate assembly is affixed to the OSA base by epoxying or welding.

The array of optoelectronic devices is mounted on a substrate assembly that includes a photodetector. The array of optoelectronic devices is mounted on a material within the substrate assembly that is transparent to the emitted light or includes a notch or hole that allows light to pass through, in order to facilitate the integral placement of the monitor within the substrate assembly and beneath the material. The monitor may be a photodetector capable of monitoring the representative optical output of the VCSELs.

BRIEF DESCRIPTION OF THE DRAWINGS

FIG. 3C is another perspective view of the third exemplary embodiment of the optical subassembly module of the present invention;

FIG. 4A is a perspective view of a fourth exemplary embodiment of the optical subassembly according to the present invention;

DETAILED DESCRIPTION

The present invention provides an optical subassembly module with high optical coupling efficiency, and a method of aligning and joining the components of the optical subassembly module.

The optical subassembly module includes optical fibers that may be single-mode fibers, multi-mode fibers, or other types of optical fibers (e.g. plastic). The optical fibers are fixed into an array within the optical connector that may be a conventional MT or other optical ferrule. The optical subassembly module includes a corresponding array of optoelectronic devices. The corresponding arrays may be one-dimensional or two dimensional arrays that include any number of individual optoelectronic devices and corresponding optical fibers. The optoelectronic devices may be edge-emitting lasers, superluminescence diodes, VCSELs, photodetectors or any other type of optoelectronic device. The optical subassembly module may include a photodiode or other photodetector for monitoring the optical output of emitting optoelectronic devices. The photodetector receives a proportional fraction of the emitted light and may be disposed in any of various locations. It may, for example, monitor light emitted from the face of a bi-directional emitting laser opposite the data direction or it may be arranged to receive a proportionate fraction of the light emitted from a unidirectional surface emitting VCSEL. It may be configured to monitor representative light emitted by a data VCSEL or by an extra VCSEL included for representative monitoring purposes.

The assembled optical subassembly module is a connectorized, non-pigtailed module that enjoys the advantage of reduced costs and board size compared to pigtailed alternatives. The optical subassembly module includes an optical connector such as an optical ferrule, an optical subassembly (OSA) base plate and a substrate assembly. The substrate assembly includes the VCSEL die (or other optoelectronic device die) and (in some embodiments) the monitor photodetector, a ceramic mounting substrate, a weldable metal plate, and optionally another silicon or other semiconductor substrate. The OSA base may be formed of a weldable metal block. The weldable metal plate and the metal block of the OSA base may include facing surfaces that are slideable over one another. The optical ferrule is affixed to the OSA base by means of pins or other mechanical coupling devices, then the substrate assembly is maneuvered relative to the fixed components until a preferred alignment position is achieved. Once a preferred alignment position is achieved, the substrate assembly is permanently affixed to the OSA base plate by epoxying welding. The optical subassembly module formed by actively aligning the substrate assembly to the fixed components, or vice versa, provides a high optical coupling efficiency and may then be joined to a motherboard.

Figure 1:
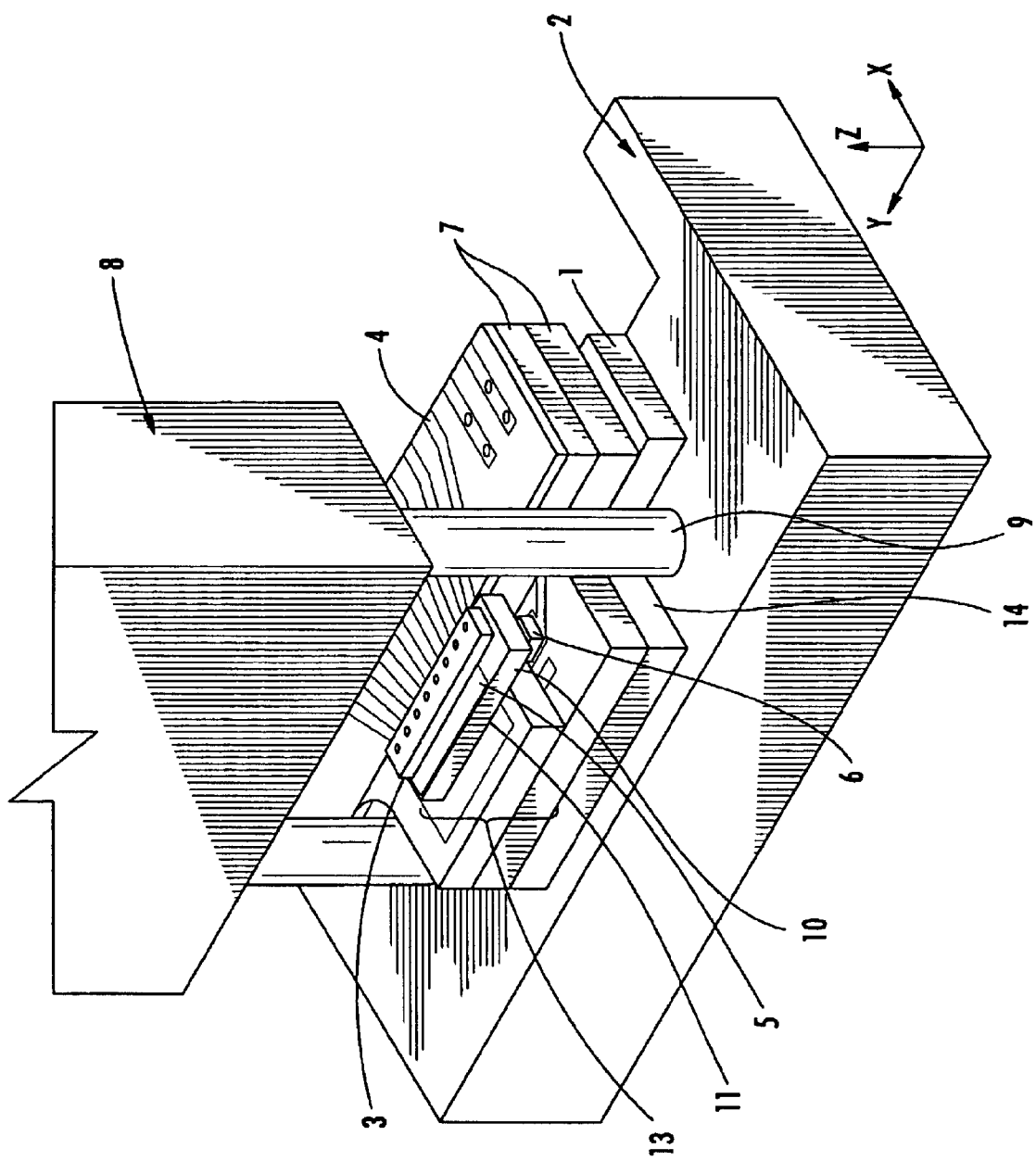
FIG. 1 is a perspective view of a first exemplary embodiment of the optical subassembly module according to the present invention.

FIG. 1 shows a perspective view of a first exemplary embodiment of the optical subassembly module of the present invention. The optical subassembly module includes optical ferrule 8 joined to OSA base 2 by means of pins 9. Optical ferrule 8 houses an array of optical fibers and may be a conventional MT ferrule. The ends of the optical fibers form a planar array that corresponds to the planar array of optoelectronic devices to which optical ferrule 8 will be coupled. In the exemplary embodiment shown in FIG. 1, VCSEL die 3 includes a linear array of eight VCSELs. It should be understood that any of various numbers of VCSELs may be included and the arrays may be two-dimensional planar arrays. It should be further understood that the use of VCSELs is intended to be exemplary only and that other optoelectronic devices may be used alternatively. Examples of other such optoelectronic devices include other lasers and photodetector devices. For simplicity, hereinafter VCSELs and other such optoelectronic devices will be referred to collectively as VCSELs.

Within optical ferrule 8, the optical fibers may be multi-mode or single-mode fibers. The optical fibers of the array are precisely and accurately spaced with respect to one another. An industry standard spacing may include a 250 micron pitch between adjacent optical fibers in the one dimensional array. The corresponding array of VCSELs is designed to the same pitch and fixed in the same relative positions. The array of optical fibers within the optical ferrule is also precisely fixed with respect to the alignment holes or guide pins or other receiving members (not shown) within optical ferrule 8. The openings in the optical ferrule 8 are each configured to receive pins, struts or other global alignment members such as pins 9 from OSA base 2. Pins 9 and the corresponding receiving holes in optical fiber 8 may be spaced according to industry standards, such as IED 1754-5 standard. Optical ferrule 8 may be any of various conventional customer ferrules as used in the telecommunications industry. Pins 9 are formed of rigid, mechanically stable materials. OSA base 2 is a weldable metal block according to this embodiment. OSA base 2 includes an upper surface that is configured to be joined to substrate assembly 13 which includes the optoelectronic devices. In the exemplary embodiment shown in FIG. 1, the upper surface of OSA base 2 is generally planar, but other configurations may be used alternatively.

According to the method of the present invention, optical ferrule 8 is first joined to OSA base 2 by means of pins 9. These components are therefore initially fixed with respect to one another along the x, y directions but motion along the z direction may be allowed until final assembly. When the units are initially coupled, optical ferrule 8 may be free to slide along the z direction. After optical ferrule 8 is fixed with respect to, OSA base 2 along the x, y, direction, substrate assembly 13 is engaged within the joined components and globally aligned to optical ferrule 8, but free to move along the x, y plane within which the VCSELs are formed. Substrate assembly 13 is generally engaged between pins 9 that function as global alignment features. Outer side walls 14 of substrate assembly 13 are generally juxtaposed with the inside portions of pins 9. Together, these features provide a mechanical stop which restricts the range of relative translational motion allowed between substrate assembly 13 and the top surface of OSA base 2. Substrate assembly 13 is free to move in the x, y directions along the top surface of OSA base 2 as the bottom surface of substrate assembly 13 is slidable with respect to the top surface of OSA base 2, each of the opposed surfaces being formed of weldable materials in the disclosed embodiment The x, y direction is generally parallel to each of the planes formed by the VCSEL array and the optical fiber array.

Substrate assembly 13 includes the array of optoelectronic devices. Arrays may include multiple rows. The optoelectronic devices may be short wavelength VCSELs, long wavelength VCSELs or other optoelectronic devices configured to emit/receive light along the plus-z direction and be coupled to the corresponding array of optical fibers secured within optical ferrule 8. In the exemplary embodiment shown, a linear array of eight VCSELs are formed on VCSEL die 3. Other configurations may be used alternatively. The eight VCSELs are spaced apart in a precise manner and include the same pitch as the corresponding array of optical fibers. In an exemplary embodiment, the pitch between adjacent VCSELs may be 250 microns. VCSEL die 3 is formed of gallium arsenide in one embodiment. VCSEL die 3 is mechanically coupled to semiconductor substrate 10 which may be formed of silicon. In alternative embodiments, semiconductor substrate 10 may be formed of glass or sapphire. According to an exemplary embodiment, VCSEL die 3 may be mechanically coupled to semiconductor 10 by use of die-attach epoxy. The underside of VCSEL die 3 includes metal that serves as a common cathode for the VCSELs. The common cathode is electrically coupled to metalized portions on the top surface of semiconductor substrate 10, which may include titanium, gold, or other conventional metal materials. Semiconductor substrate 10 is mechanically coupled to ceramic mounting substrate 7 which may be a two layer, LTCC (low temperature co-fired ceramic) material according to an exemplary embodiment. Metal traces 4 on the upper surface of ceramic mounting substrate 7 which may be formed of gold, silver, palladium, tungsten or other conventional materials, serve as individual anodes for powering the VCSELs, and are conventionally wire bonded to the VCSELs. In this manner, the individual VCSELs may be separately driven and controlled by means of the individual anode wires. Ceramic mounting substrate 7 is coupled to metal plate 1 using conventional epoxy or soldering techniques. The underside of metal plate 1 is slidable with respect to the top surface of OSA base 2 and is formed of a solderable material such as stainless steel or Kovar. Components VCSEL die 3, semiconductor substrate 10, ceramic mounting substrate 7 and metal plate 1 combine to form substrate assembly 13 which is maneuverable with respect to optical ferrule 8, pins 9 and OSA base 2 which are fixed with respect to one another. Translational motion is allowed along the x, y direction in a limited range defined by the mechanical stops.

Another aspect of the present invention is that a photodetector such as monitor 6 may be included within substrate assembly 13. Ceramic mounting substrate 7 is configured to allow for an overhang portion of semiconductor substrate 10 as shown. As shown in FIG. 1, contact metal 5 formed on semiconductor substrate 10 does not extend the full length of the VCSEL die 3. The silver die attach epoxy is therefore only used over portions of semiconductor substrate 10 in which contact metal 5 is present. This allows light to pass from the back side of the VCSEL only at the end of the semiconductor substrate where contact metal S and the silver die attach epoxy are not present. Subjacent the overhang portion, monitor 6 is positioned to receive a proportional fraction of VCSEL light emitted by one of the VCSELs along the minus-z direction. In one embodiment, a long wavelength VCSEL emitting light at a wavelength >1.25 microns emits light out of opposed directions, one directed upward and coupled to a corresponding fiber for data purposes, and the other directed downward and used for monitoring purposes. As such, back-emitting or front-emitting VCSELs may be used. The bi-directional light emission is possible because VCSEL die 3 is formed of a material, such as gallium arsenide, which is transparent to light at the emitted wavelength and because the die attach epoxy is not present in this location. The metalization on the bottom of the die can be patterned to allow light out of only part of the bottom surface, for example, only from one laser. Semiconductor substrate 10 is also chosen to be transparent to light at the emitted wavelength. This enables monitor 6 to be placed beneath the overhang portion of semiconductor substrate 10 and VCSEL die 3 and to receive emitted light that is transmitted through transparent VCSEL die 3 and semiconductor substrate 10. Monitor 6 delivers a feedback signal to a laser drive circuit to correct and modulate laser output optical power fluctuations.

According to other exemplary embodiments, monitor 6 may be disposed at various other locations. For example, a trough (not shown) may be centrally formed at location 11 within the upper of the two layer ceramic mounting substrate and a monitor may be placed subjacent VCSEL die 3 and semiconductor substrate 10 at that position to sample representative light emitted from one of the centrally formed VCSELs. This may advantageously be used to compensate for any VCSEL variations along VCSEL die 3. Since the VCSELs are formed in close proximity within the same substrate, the operational characterizing of the VCSELs are similar and therefore the-light emitted by one of the VCSELs and monitored by a photodetector or the like, is representative of the average optical output of the VCSELs. According to exemplary embodiments in which unidirectional emitting short wavelength VCSELs are used, the monitor may be disposed at various other locations to receive a proportional fraction of laser light emitted from one of the data lasers, or according to another exemplary embodiment, from an extra VCSEL.

Substrate assembly 13 is maneuvered along the x, y plane by sliding along the surface of OSA base 2 to actively align the components. In the active alignment process, the VCSELs are powered to emit light. Optical signal strength is monitored along the optical fibers and conventional techniques are used to determine maximum optical coupling efficiency and therefore the preferred alignment position. According to the exemplary embodiment in which the optoelectronic devices that form the array are photodetectors, the optical fibers may be illuminated and the photodetector output signal monitored to determine the preferred alignment position. Once the preferred alignment configuration is achieved, metal plate 1 is affixed to the metal block of OSA base 2 by welding the conterminous surfaces of the components. The metal block of OSA base 2 may be formed of weldable metal such as Kovar and weldable stainless steel. The materials are chosen to have similar coefficients of thermal expansion to that of ceramic mounting substrate 7. At this stage, optical ferrule 8 and OSA base 2 may be secured to one another along the z direction if not done so already. Conventional means may be used.

As apparent to a person of ordinary skill in the art, the optical subassembly module is understood to include mechanical and electrical coupling means to couple to a motherboard, PCB, or other electrical conducting medium. Said mechanical coupling means may include a flange, tabs, detents, or the like to removably secure the OSA module to the PCB or motherboard, and said electrical coupling means may include a flex circuit, wire bonds, or the like for electrically coupling the substrate assembly to the PCB or motherboard.

Figure 2:
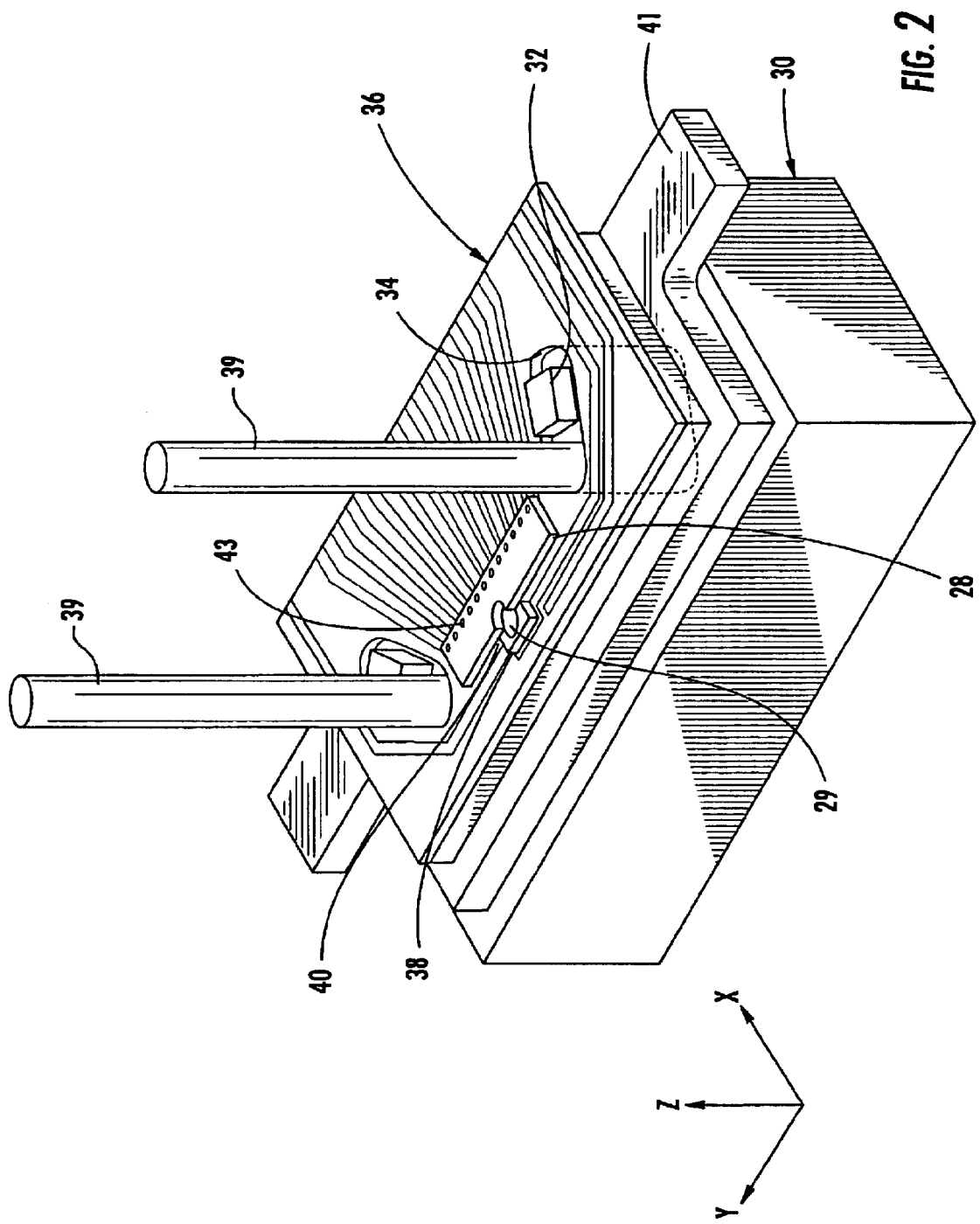
FIG. 2 is a perspective view of a second exemplary embodiment of the optical subassembly module according to the present invention.

Now turning to FIG. 2, a second exemplary embodiment of a configuration for an optical subassembly module according to the present invention, is shown. As discussed in conjunction with FIG. 1, it should be understood that an optical ferrule such as described in conjunction with FIG. 1 (not shown in FIG. 2), is globally aligned and secured into position over pins 39. Metalized ceramic substrate 36 includes VCSEL die 43 that includes 12 VCSELs plus an extra VCSEL 29 (beneath epoxy material 40) in the exemplary embodiment. According to this exemplary embodiment, metal plate 41 and ceramic substrate 36 are affixed together with epoxy, solder, or other means. The optical ferrule (not shown) is fixed in the Z direction by the mechanical stop formed by raised mesas 32 of metal plate 41, which extend through corresponding apertures 34 formed within metalized ceramic substrate 36. The metal plate 41 and pin holding plate 30 are maneuvered with respect to one another in the x, y direction by sliding the opposed slidable surfaces relative to one another until a preferred alignment position is achieved. After this active alignment procedure, metal plate 41 is joined to pin holding plate 30 using laser welding, conventional welding, epoxy, or other methods.

The VCSEL array includes extra VCSEL 29 that is obscured in the drawing by epoxy material 40. Laterally adjacent extra VCSEL 29 is photodetector die 38. Epoxy material 40 may include scattering elements so that a photodetector formed on photodetector die 38 receives a proportional fraction of the light emitted by extra VCSEL 29. Such a technique is disclosed in provisional patent application titled Apparatus and Method for VCSEL Monitoring using Scattering and Reflection of Emitted Light, Ser. No. 60/236,684, filed on Sep. 29, 2000, which is hereby incorporated by reference as if set forth in its entirety.

Figure 3A:
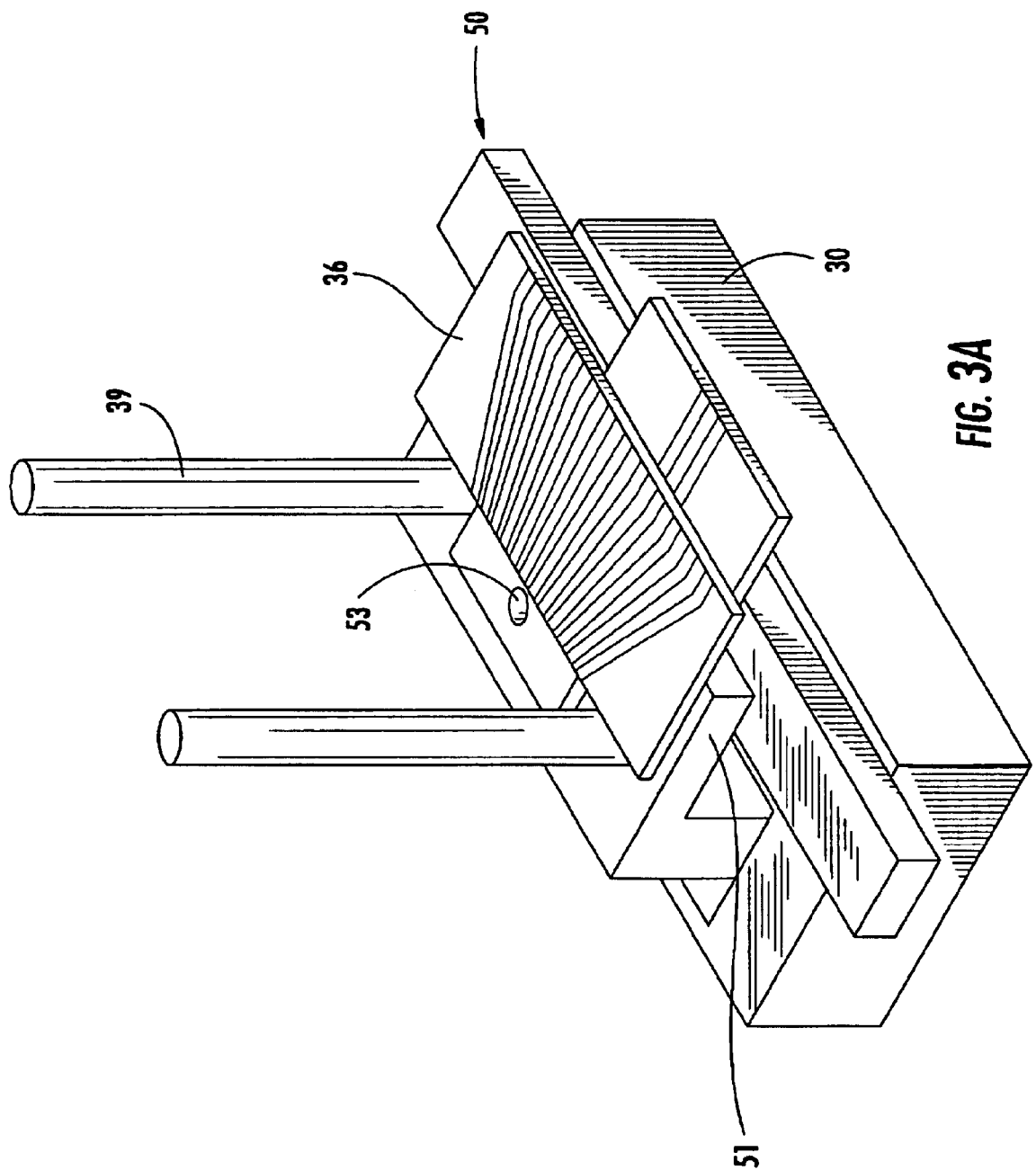
FIG. 3A is a perspective view of a third exemplary embodiment of the optical subassembly module according to the present invention.
Figure 3B:
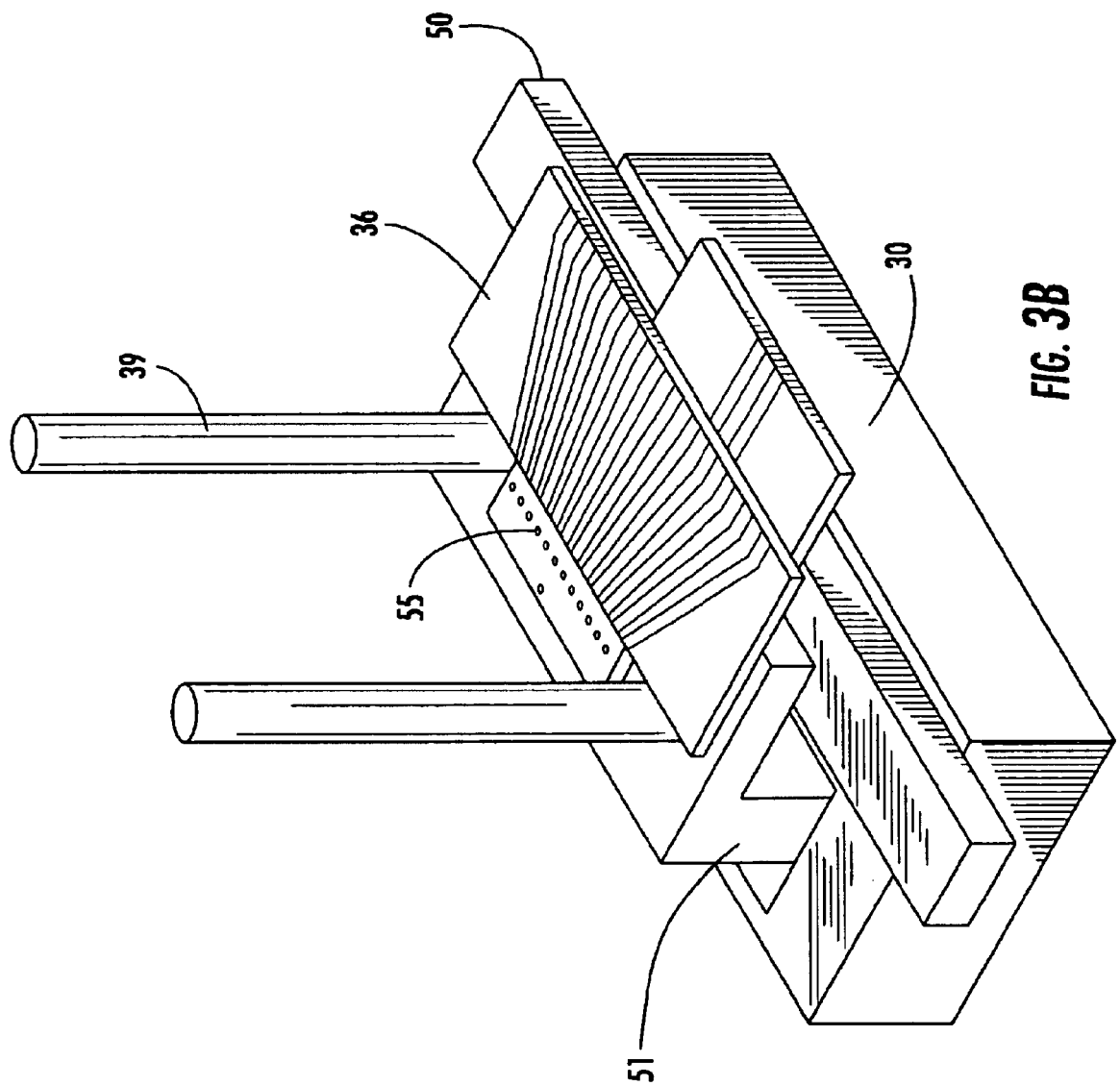
FIG. 3B is a perspective view of the third exemplary embodiment shown in FIG. 3A with a VCSEL array in place.

FIGS. 3A—3C show another exemplary embodiment of a configuration of an optical subassembly module according to the present invention. According to the third exemplary embodiment shown in FIG. 3A, weldable metal 50 includes upper platform 51 which overhangs other portions of weldable metal 50. Hole 53 extends vertically through each of the metalized ceramic substrate and upper platform 51. In this manner, a photodetector may be placed beneath upper platform 51 of weldable metal 50 to receive light emitted by a VCSEL placed above hole 53. Such an arrangement is advantageous when a bi-directional emitting VCSEL is used such as a 1300 nm VCSEL. FIG. 3B shows the configuration shown in FIG. 3A, with VCSEL array 55 in place. VCSEL array is arranged to position one of the VCSELs over hole 53. Hole 53 shown in FIG. 3A may be located to receive the back emitted light from any of the VCSELs shown in VCSEL array 55 of FIG. 3B. FIG. 3C shows the third embodiment arrangement shown in FIGS. 3A and 3B, with monitor 56 in place beneath hole 53.

Figure 4B:
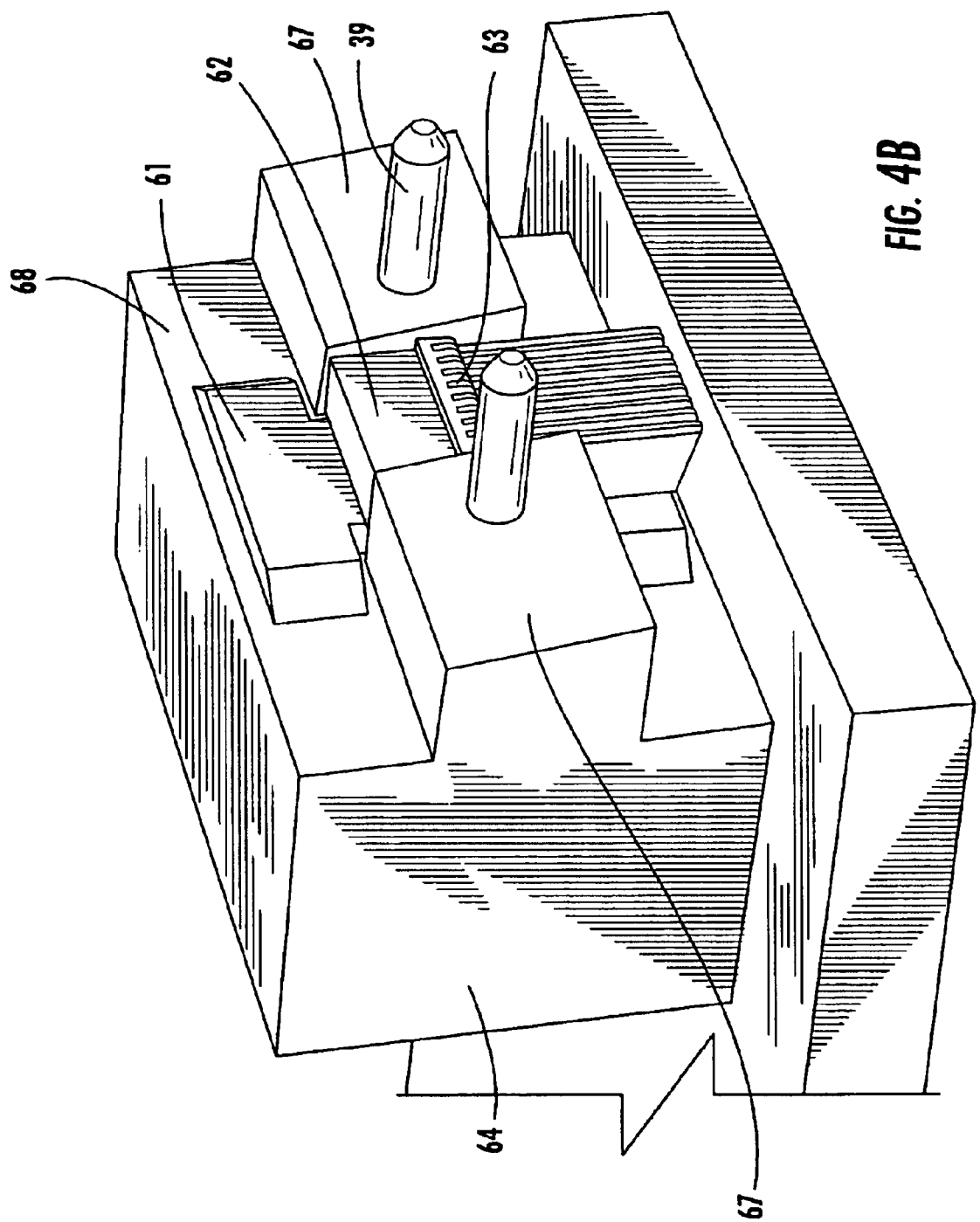
FIG. 4B is a perspective view of the fourth embodiment with a VCSEL array in place.
Figure 4C:
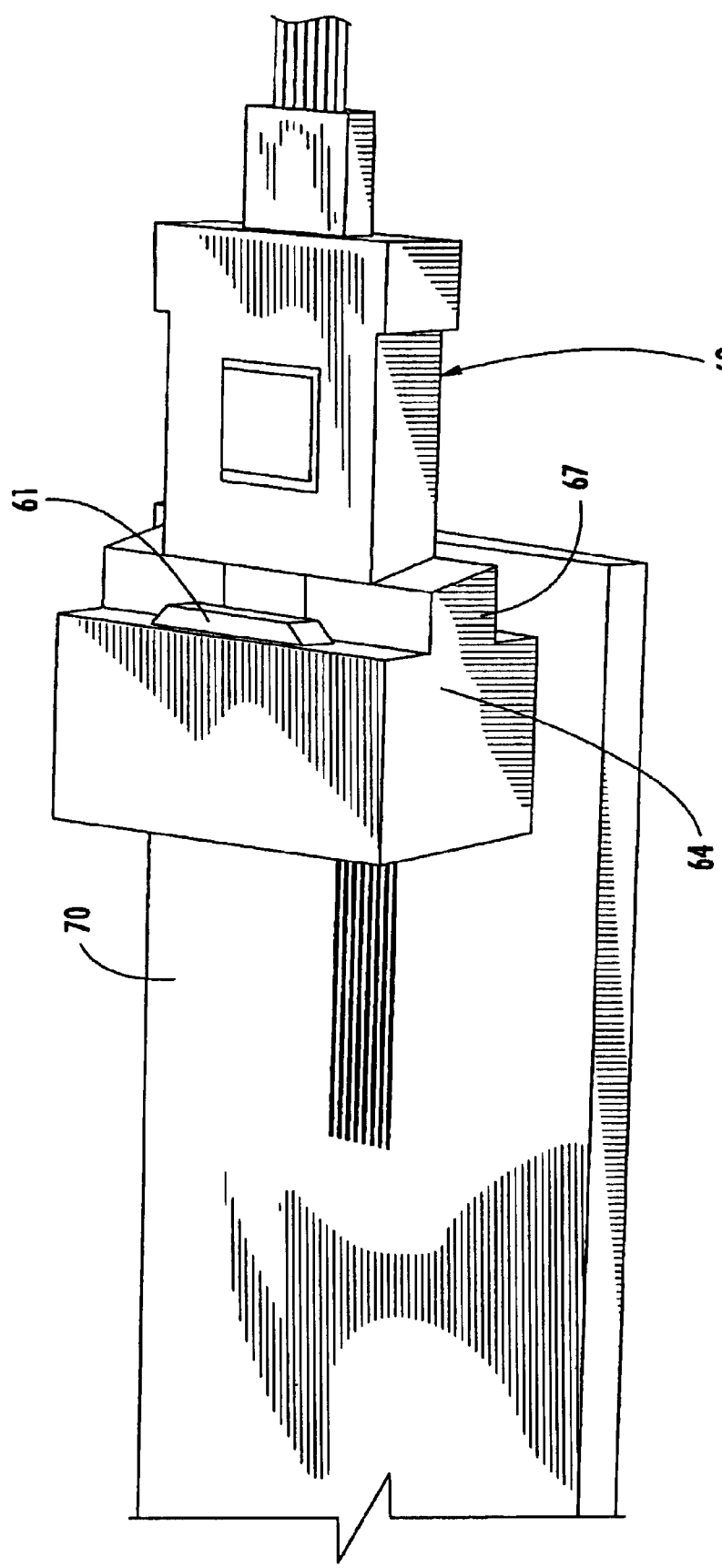
FIG. 4C is a perspective view showing the fourth exemplary embodiment of the optical subassembly module mounted on a motherboard.

FIGS. 4A–4C show a fourth exemplary embodiment of a configuration of the optical subassembly module of the present invention. Ceramic mounting substrate 62 is affixed to "I-shaped" metal plate 61. VCSEL die 63 is affixed to ceramic mounting substrate 62. Substrate assembly 65 including "I-shaped" metal plate 61, ceramic mounting substrate 62 and VCSEL die 63 is then positioned globally in the notch formed between raised sections 67 on OSA base 64. Once substrate assembly 65 is loosely engaged within the notch, an optical ferrule (not shown) is affixed to OSA base 64 such that it is fixed in position and cannot translate with respect to the plane formed by surface 68 of OSA base 64. Substrate assembly 65 is free to move along the x, y direction (along surface 68) within a range determined by the mechanical stops afforded by "I-shaped" metal plate 61 and raised portions 67 of OSA base 64. Substrate assembly 65 is slid over surface 68 of OSA base 64 and active alignment techniques are used to finally position the components in one alignment embodiment such as shown in FIG. 4B. Metal plate 61 is joined to OSA base 64 by welding.

FIG. 4C shows the fourth exemplary embodiment as shown in FIGS. 4A and 4B, coupled to optical ferrule 69 and mounted on motherboard 70. In an exemplary embodiment, optical ferrule 69 may be a standard, single-mode MT optical ferrule housing an array of single-mode optical fibers. The completed optical subassembly module is mounted on motherboard 70 using conventional techniques. The connection shown in FIG. 4C is a connectorized, non-pigtailed embodiment of a ferrule coupled to optoelectronic devices. Electrical connections between the optical subassembly module and motherboard 70 may be made using conventional methods, for example, castellations or brazed pins may be used to make a 90 degree electrical connections if the motherboard is a PCB or ceramic board. In various other embodiments in which motherboard 70 is formed of other materials, various other conventional methods may be used for physically mounting the optical subassembly module on the board and for providing high quality electrical connections (flex, flex rigid, branded leads, etc.).

Figure 5A:
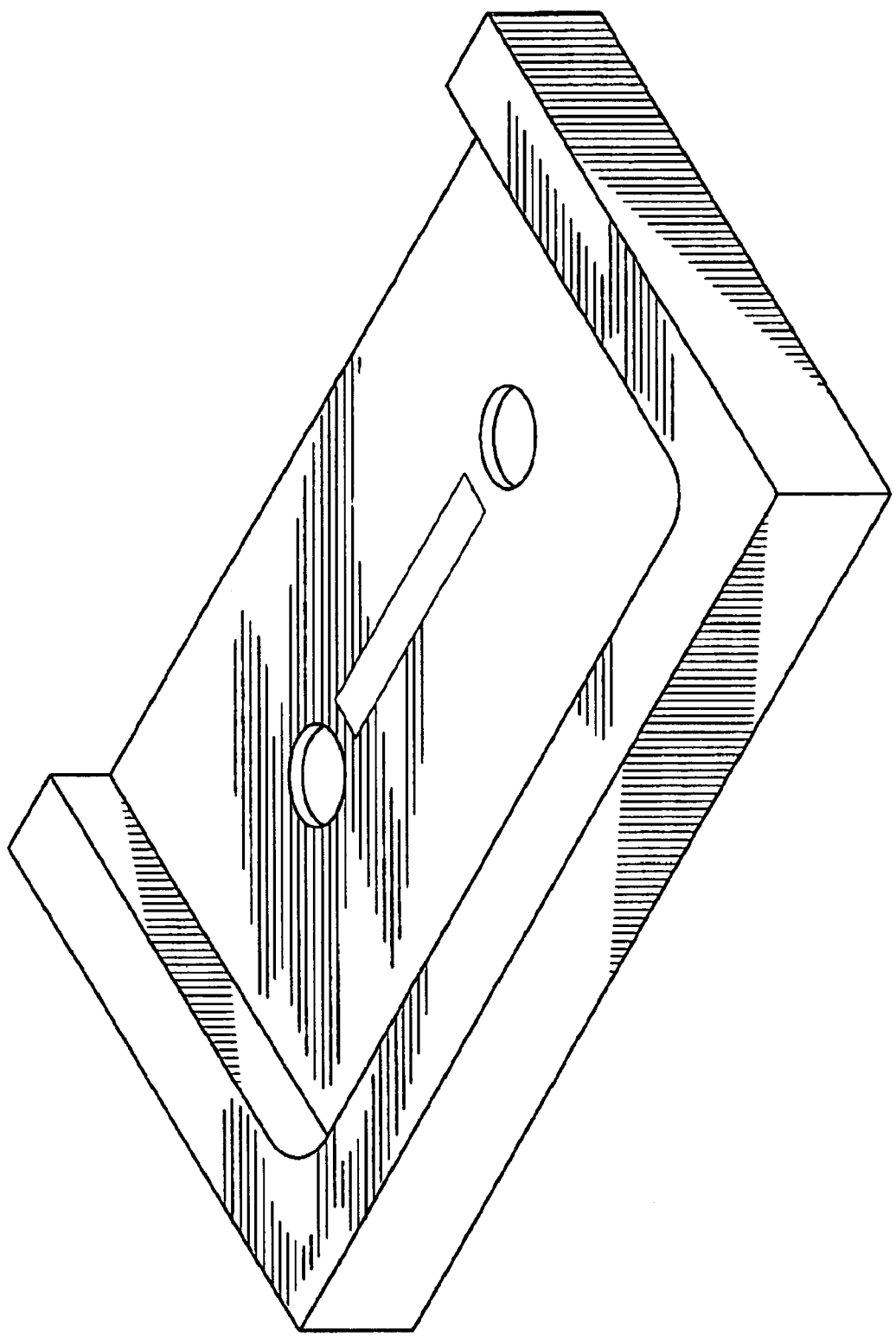
FIG. 5A is a perspective view of part of a fifth exemplary embodiment of the optical subassembly module according to the present invention.
Figure 5B:
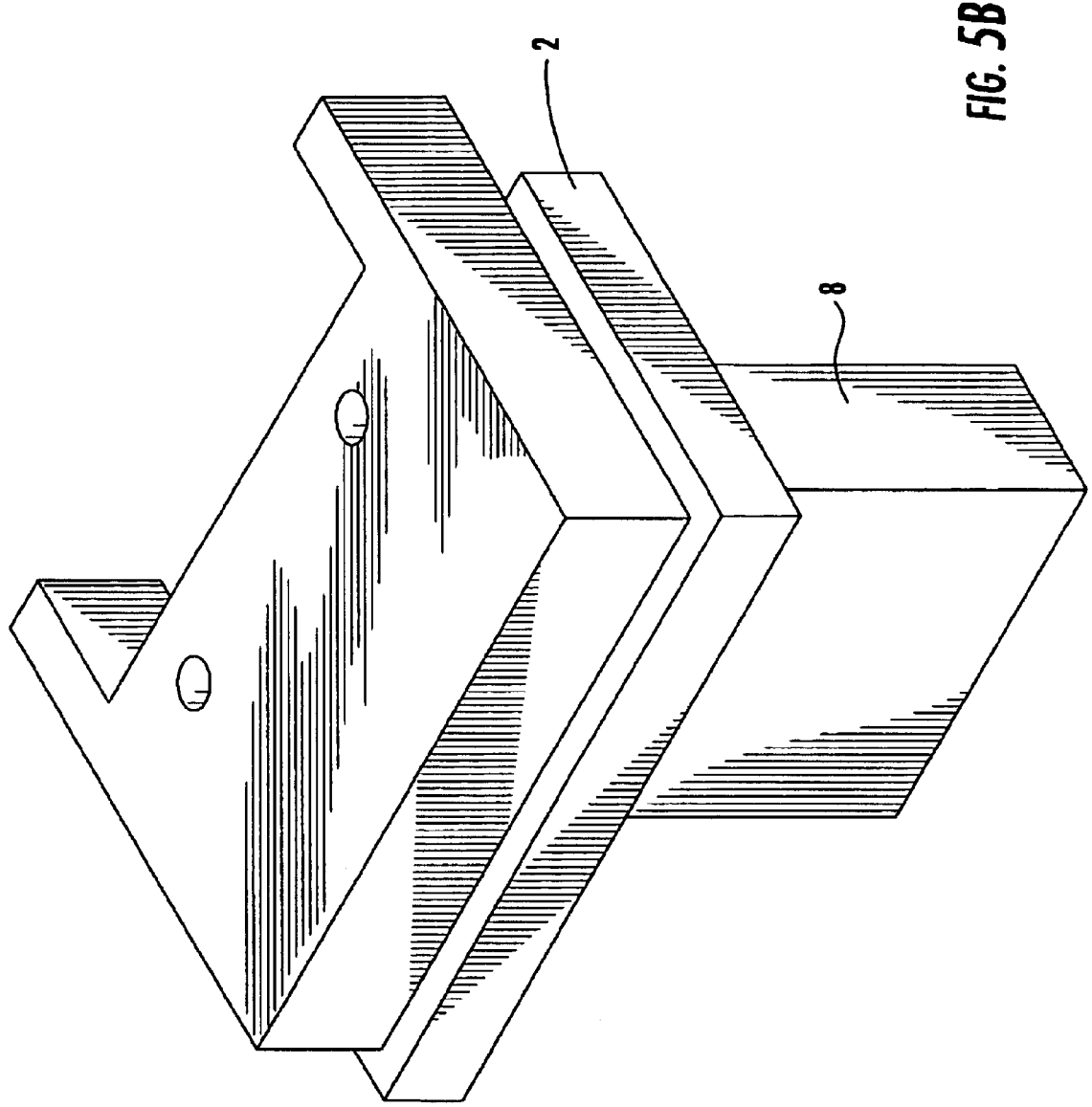
FIG. 5B is a perspective view of the fifth exemplary embodiment of the optical subassembly module of the present invention.

FIGS. 5A and 5B show a fifth exemplary embodiment of a configuration of the optical subassembly module of the present invention. FIG. 5A shows a portion of the optical subassembly module—a metalized semiconductor substrate joined to a metal plate. The arrangement includes a set of holes for receiving pins extending from an OSA base to provide for the mechanical coupling and global alignment of the a holding plate, such as OSA base 2 shown in FIG. 1, to an optical ferrule such as optical ferrule 8 shown in FIG. 1. The exemplary configuration shown in FIGS. 5A and 5B, finds particular application in conjunction with rear-emitting VCSELs. According to this fifth exemplary embodiment, a VCSEL die is placed over the top surface of the metalized semiconductor substrate that is formed of a semiconductor material chosen to be transmissive to light emitted by the rear-emitting VCSELs. The die is attached on a non-metalized surface of the semiconductor with a non-conductive, optically clear epoxy. The top surface of the VCSEL die—the surface in which the VCSELs are formed, is oriented generally upward according to the perspective view shown in FIG. 5A, and a conventional ferrule such as a MT ferrule is subjacently coupled to the arrangement. The coupled optical subassembly module is shown in FIG. 5B.

Although not shown, it should be understood that the various features disclosed in conjunction with the other embodiments are similarly included in the fifth exemplary embodiment.

According to another exemplary embodiment of the apparatus and alignment method of the optical subassembly module according to the present invention, the substrate assembly such as substrate assembly 13 shown in FIG. 1, and which includes the array of optoelectronic devices, is secured initially to the optical subassembly base such as OSA base 2 also shown in FIG. 1. The optical subassembly base includes receptacles for receiving pins, struts, or other similar, rigid mechanical coupling devices. An optical ferrule also includes receptacles to receive the opposed ends of the pins or other mechanical coupling devices. In this embodiment, receptacles in the OSA base are oversized relative to the pins or other mechanical coupling devices to allow for a limited range of motion along the x, y direction. In the optical ferrule, the pins or other mechanical coupling devices are securely fixed. In this manner, the components may be maneuvered along the x, y direction with respect to one another and within the limited range determined by the degree of oversizing of the receptacles relative to the pins or other mechanical coupling devices. Active alignment techniques are then used to determine the preferred alignment position and then the pins or other mechanical coupling devices are securely affixed within the oversized receptacles. Conventional epoxying or welding means may be used to join the components.

According to one exemplary embodiment, the optical subassembly base may include conduits that extend through the OSA base along the coupling direction. According to this exemplary embodiment, the mechanical coupling devices may be pins that are securely fixed to the optical ferrule through the conduits. The pin diameter and hole diameter are chosen to allow for a limited range of motion in the x, y direction between the ferrule and the VCSEL array which is fixed into position on the OSA base. The limited range of motion is restricted by the relative diameters of the pin and the hole in the OSA base. In this manner, active alignment can be used to find a preferred alignment position and the pins permanently fixed in position with respect to the OSA base. In an exemplary embodiment, on the side opposite the optical coupling side, the OSA base may include orifices for accommodating pinheads.

Figure 6:
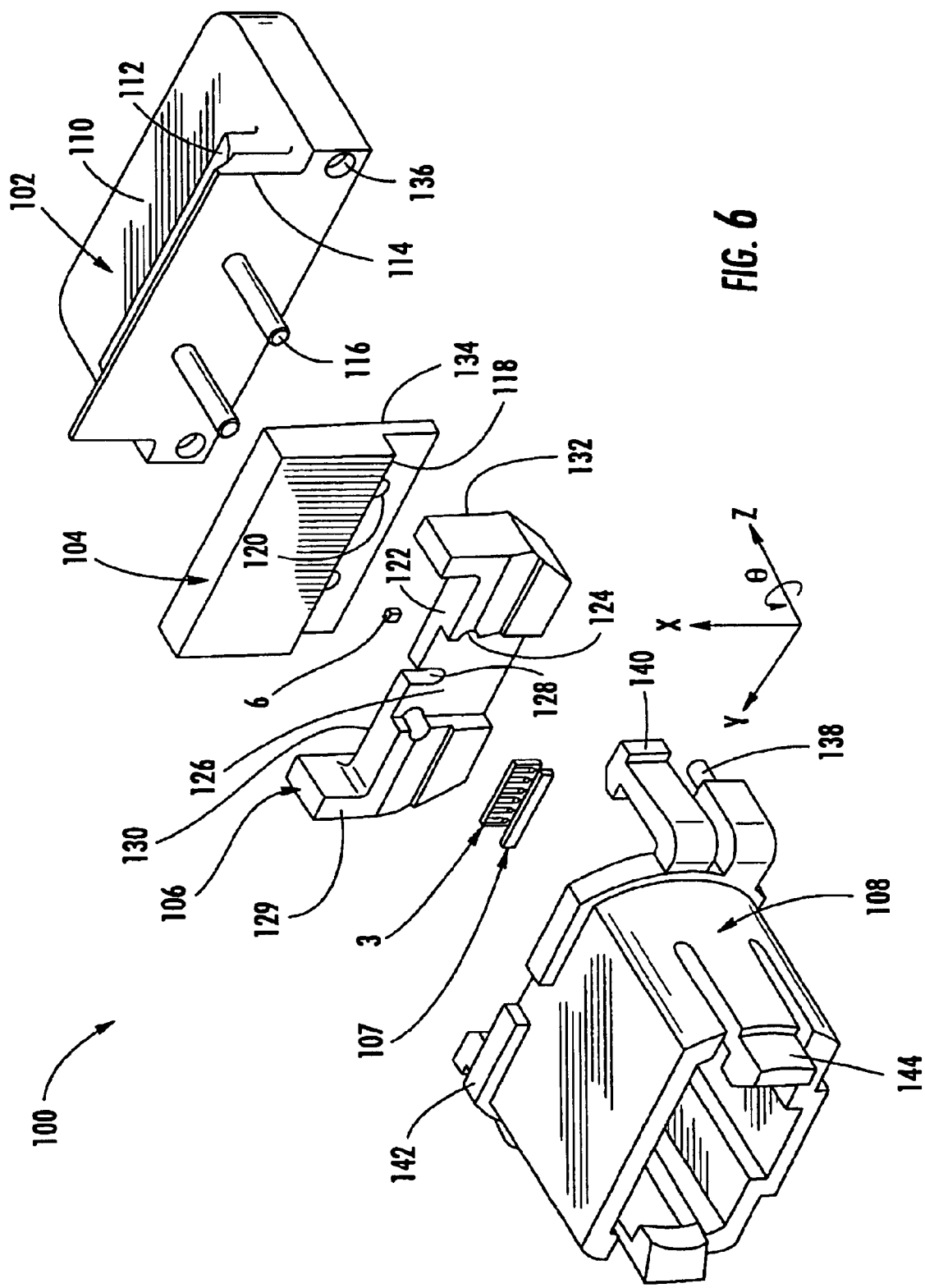
FIG. 6 is a perspective view of a sixth exemplary embodiment of the optical subassembly module of the present invention.

FIG. 6 is still yet another alternative embodiment. In addition to the components discussed, the present alternative embodiment includes a conventional snap connector 108, such as an MPO connector latch. As readily apparent to persons of ordinary skill in the art, the snap connector latch 108 serves as a coupler to couple the MT ferrule (not shown) when the MT ferrule is mated to the substrate assembly (and to prevent accidental uncoupling). In addition, the present alternative embodiment employs a flip-chip mounted lens 107 to provide longer working distance between the VCSEL array and the optical fibers. With the flip-chip lens, coupling efficiency is maintained even though the distance or gap between the VCSEL array and the optical fibers is widened from, for example, 200 μm to about 500 μm. This may be achieved by designing the lens by any suitable method to refract the optical signals such that the signals are focused to the plane of the faces of the optical fibers mounted in the MT ferrule. In another embodiment, a lens may be designed to simply columnate the optical signals such that the signals diverge to a lesser degree, thus extending the working distance of the signals and allowing the face of the MT ferrule to be further away from the VCSELs without sacrificing too much coupling efficiency.

In broad terms, in the embodiment of FIG. 6, the modified optical subassembly module 100 includes a base unit or pin plate 102, a ceramic substrate 104, a VCSEL frame or weld plate 106, the same VCSEL die 3 and monitor diode 6, a flip-chip lens 107, and an MPO connector latch 108. The base unit 102 and the weld plate 106 may be made of a weldable material such as stainless steel (the material choice in one embodiment matching the CTE of the fiber stub array). The base unit 102 resembles two integrated plates at a right degree angle. However, a solid rectangular block and/or other angles are also contemplated for the base unit depending on the particular application.

As indicated in FIG. 6, the base unit 102 comprises a horizontal section 110 and a reinforcement member 112 for reinforcing the joint between the horizontal section 110 and the vertical section 114. Two guide pins 116, are pressed fit into a pair of guide holes along the vertical section 114 of the base unit 102. In an exemplary embodiment, epoxy is used to permanently affix the guide pins 116 to the base unit 102. As previously discussed, the guide pins are machined and positioned to industry standard.

The ceramic substrate 104 is generally rectangular and includes a cut out section that exposes a ledge 118. The ceramic substrate also has two oversized alignment holes 120 (oversized as compared to the diameter of the guide pins 116). Accordingly, when the oversized alignment holes 120 are slid over the guide pins, there is slack between the inside diameter of the holes and the guide pins 116. As further discussed below, this slack enables the ceramic substrate to move in the x, y, and theta directions during active alignment.

The ledge 118 is oriented so that when the ceramic substrate 104 is coupled to the weld plate 106, the ledge 118 sits on top of the deck 122 on the upper periphery of the weld plate 106. In this seated position, the oversized alignment holes 120 coincide with another pair of oversized alignment holes 124 on the weld plate 106.

The weld plate 106 has a U-shaped configuration. On the side facing the MPO connector latch 108, there is a channel 126 that runs the height of the weld plate 106 beginning at the deck 122 and on down to the other edge opposite the deck. The width of the channel 126 can be the width of the weld plate. However, in an exemplary embodiment, the width is approximately slightly larger than the width of the VCSEL array 3. At the mid-point of the channel 126 where the channel intersects the deck 122, a notch 128 is provided that is also of a generally U-shaped configuration. Like the function of the hole 53 in FIG. 3C, the notch is designed to permit signals from a bi-directional VCSEL to pass through and onto a monitor diode that is positioned near the exit side of the notch 128. More specifically, when the weld plate and ceramic substrate are mated, the monitor diode 6 is positioned on the ceramic substrate 104, just below the ledge 118, and in-line with the notch 128. Accordingly, when signal is emitted from a bi-directional VCSEL, the signal may be detected by the monitor diode 6.

The weld plate is further equipped with an optional pair of risers 129. These risers align the ceramic substrate 104 and the weld plate 106 generally or globally in the lateral or y direction for rough alignment. In an exemplary embodiment, this is accomplished by locating and fixing the ceramic substrate 104 within the space defined by the two risers 129. However, a pair tongue and groove or detent means may also be employed for this purpose. On the back side of the weld plate 106, or the side facing the ceramic substrate 104, a larger channel 130 is provided which runs the width of the weld plate, extending approximately from one riser to the other. This channel is provided so that when the ceramic substrate 104 and the weld plate 106 are in a seated or mated position, the back edge 132 of the weld plate 106 sits flush with the back edge 134 of the ceramic substrate 104. As further discussed below, this permits the weld plate 106 to be permanently affixed to the base unit 102, after active alignment is achieved, by welding the edges 132 of the two risers 129 to the base unit 102.

As apparent to a person of ordinary skill in the art, the weld plate and the ceramic substrate can be configured a number of different ways depending on the type of emitters used, whether a proportional signal or a direct signal is monitored, and whether an extra laser is used. For example, the risers can be wider-or alternatively be eliminated, the base unit can be a solid block, and the VCSEL frame can have square corners rather than tapered corners. These, and equivalent changes, are understood to fall within the scope of the present invention.

As previously discussed, the VCSEL die 3, the photodiode or monitor diode 6, the ceramic substrate 104, and the weld plate 106 are first passively aligned and bonded using prior art flip-chip bonding technology and pick-and-place die-attach equipment such as a FINEPLACER® device. In this passive alignment, the VCSEL array 3 and the flip-chip lens 107 are mounted in the channel 126 with one of the VCSELs aligned and configured to pass signals out through the notch 128. The bonded and aligned components, also referred to as substrate assembly, are then coupled to the pin plate 102 via sliding the oversized alignment holes 120 and 124 over the guide pins 116 and actively aligning in a similar manner as previously disclosed. The MPO connector latch 108 is then mounted to the pin plate 102. This is accomplished by providing a pair of connector guide holes 136 along the opposing ends of the lower edge of the pin plate 102 to accept a pair of placement pins 138 on the connector latch 108.

To prevent the connector latch 108 from uncoupling from the base unit 102, a pair of latch arms 140 located along the two edges of the connector flange 142 are provided. The latch arms 140 include a male detent on each arm. Each male detent and arm are configured to deflect as the MPO connector 108 is inserted over the pin plate, and to spring back and grip the vertical section 114 of the pin plate 102.

Figure 7:
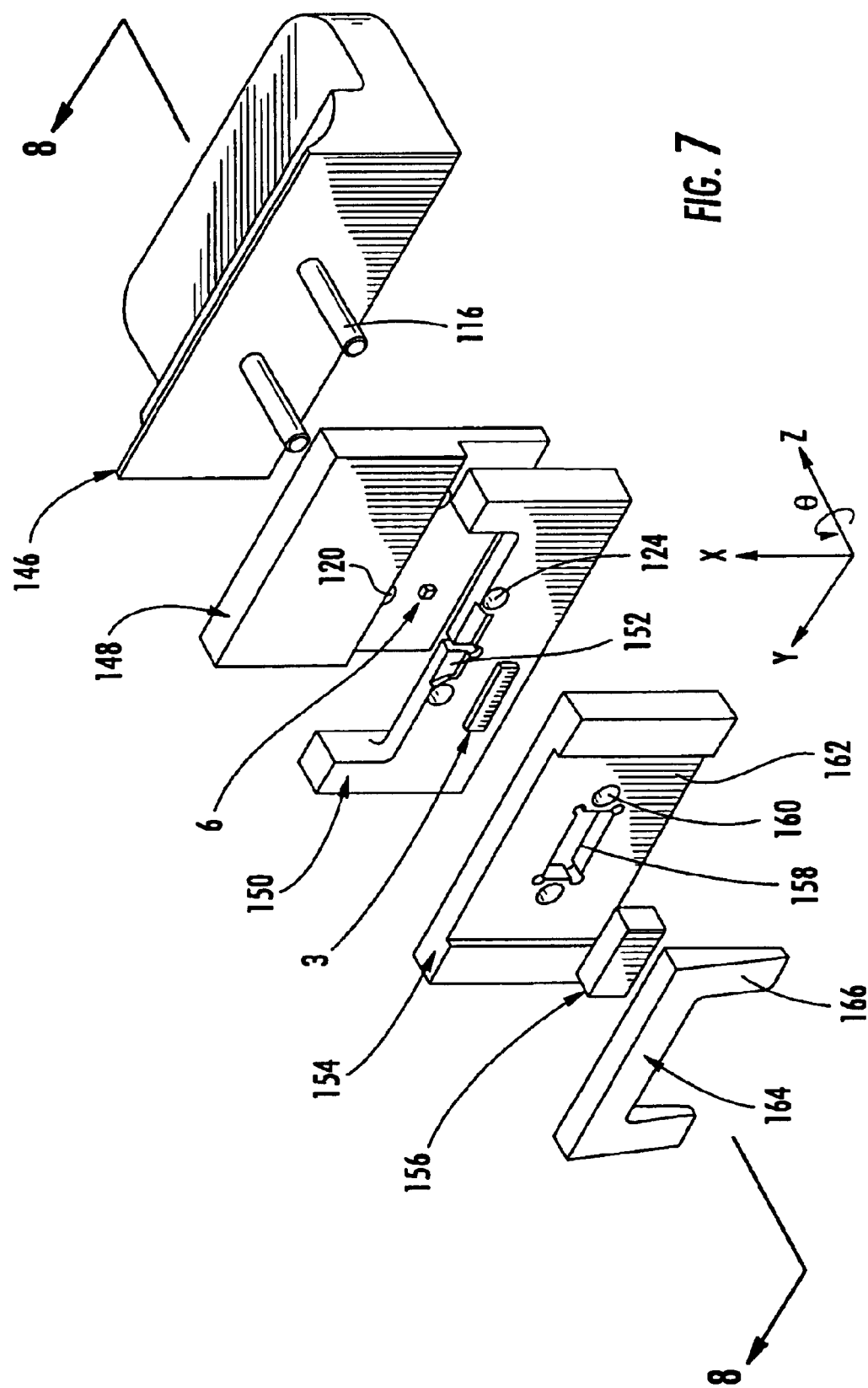
FIG. 7 is a perspective view of an another exemplary embodiment of an optical subassembly module according to the present invention.

FIG. 7 is another alternative embodiment that uses a combination of a lens array and a VCSEL array for facilitating a good optical coupling efficiency while simultaneously providing adequate clearance from the VCSEL array and the MT ferrule. The embodiment of FIG. 7 includes a similar pin plate 146, a similar ceramic substrate 148, and a similar weld plate or VCSEL frame 150 as the embodiment of FIG. 6, with a few exceptions. The pin plate 146 does not have a pair of connector guide holes 136, and the weld plate 150 has a shallow channel or recess area 152 sized and configured to accept the VCSEL array 3. Accordingly, when the VCSEL array 3 is positioned within the channel 152, it seats generally flushed within the channel.

A lens frame 154, which may be formed a weldable material such as stainless steel, is provided with the embodiment of FIG. 7. The lens frame 154 is configured to accept the lens array 156 in a centrally located well 158 in a close tolerance fit arrangement. The well 158 is disposed between a pair of oversized alignment holes 160, which coincide with the alignment holes of the VCSEL frame 150 and the ceramic substrate 148. The well 158 is shown with four enlarged circular cut-outs at the four well corners. These cut-outs are merely byproducts of a machining process for cutting out the well corners and are not essential to the present invention.

The lens frame 154 further includes a wide center channel 162 created by machining and removing materials from the center section. As further discussed below, this permits an adjustable stop member 164 to sit in a slightly recessed manner within the center channel 162. In addition, the channel fixes the adjustable stop member 164 in the lateral y direction with respect to the lens frame 154 by providing a stop against the two sides of the adjustable stop member. The adjustable stop member 164 is made from a metal material such as stainless steel. However, any number of materials such as ceramic, aluminum or various polymers may be used without deviating from the scope of the invention.

In an exemplary embodiment, alignment may be carried out in the following fashion. First, the ceramic substrate 148, the VCSEL array 3, and the monitor diode 6 are passively aligned by prior art methods, such as with a pick-and-place-device like the FINEPLACER® system. In a separate step, the lens array 156 is inserted into the well 158 of the VCSEL frame and epoxied in place. The substrate assembly and the combination lens frame 154 and lens array 156 are then slid over the guide pins.

Figure 8:
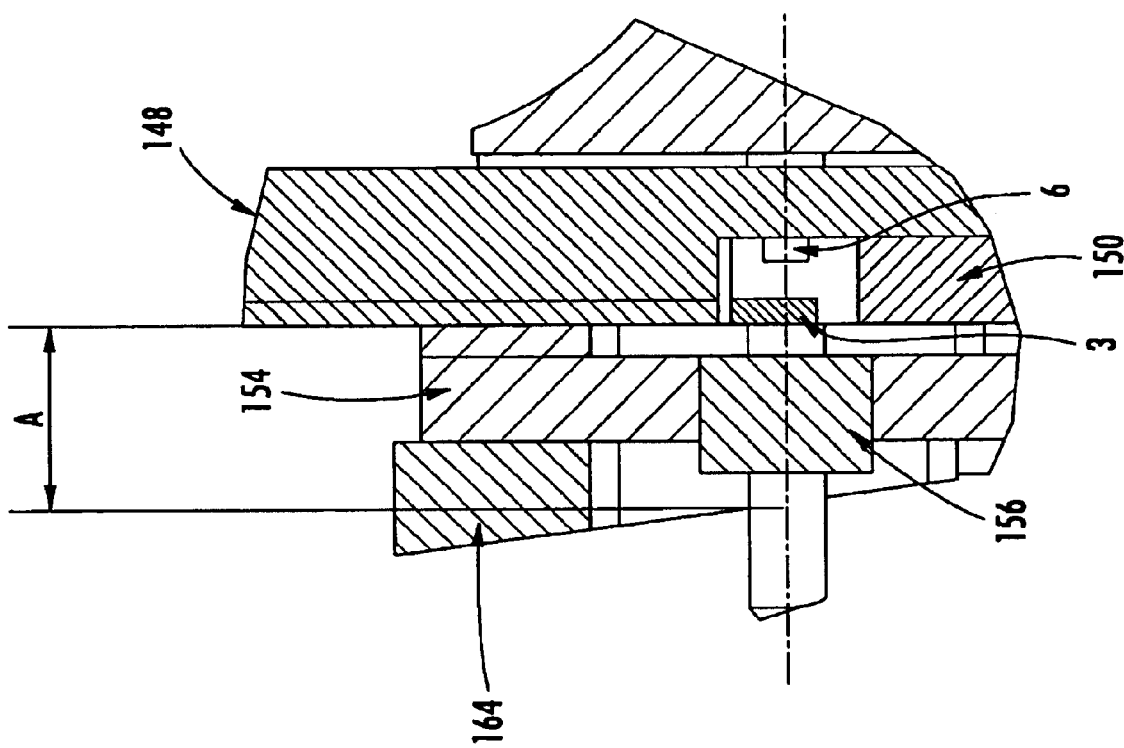
FIG. 8 is a cross-sectional view of assembled FIG. 7 taken at line A—A.

Next, a conventional MT ferrule (not shown) is slid over the guide pins 116. However, a gap is provided between the ferule and the VCSEL lens (i.e., the ferrule is not pushed all the way forward) for the installation/insertion of the adjustable stop member 164. The adjustable stop member 164 has an inverted U-shaped configuration having two arms portion 166 that are tapered with the same angle as the conventional connector for single-mode fibers. Consequently, as the conventional ferrule is further slid along the guide pins in the z direction and the adjustable stop member 164 is concurrently adjusted in the vertical x direction along the center channel 162, the ferrule and the adjustable stop member eventually contact. Referring to FIG. 8, at the point of contact, the fibers in the ferrule and the VCSEL array 3 are separated by a distance A. This distance A is defined by the measurement between the tip of the conventional ferrule and the tip of the VCSEL array 3, when measured from the centerline of the guide pins. As readily understood by persons of ordinary skill in the art, this gap is adjustable by sliding the adjustable stop member 164 up and down in the vertical x direction while moving the conventional connector along the z direction to maintain contact.

In an exemplary embodiment, active alignment may be performed by powering up the VCSEL array 3 and monitoring the output of the VCSEL array at the other end of the MT ferrule. Adjustments in the x, y, and theta directions are then performed (i.e., by moving the substrate assembly and the lens frame about the slack between the guide pins and the alignment holes) while monitoring the signals. Once alignment is achieved (such as when maximum signal strength is recorded for a particular x, y, and/or theta adjustment), the lens frame may be welded to the VCSEL frame, and the VCSEL frame may be welded to the pin plate 146 to permanently fix the optical subassembly. Note that although welding is mentioned as an option, other retention means are also contemplated, such as epoxy, detents, fasteners, and the like. Finally, the gap between the conventional connector/ferrule and the lens is set by moving the adjustable stop member 164 in the x direction until a desirable signal corresponding to a desirable gap is achieved. As readily understood by persons of ordinary skill in the art, since the stop member 164 is tapered, any movement in the x direction will cause a corresponding movement of the ferrule in the z direction by way of the tapered surface. When a desirable gap is achieved, the adjustable stop member 164 may be permanently fixed to the lens frame 154 by epoxy or welding. In a slightly modified process, the alignment steps disclosed may be performed iteratively until acceptable coupling is achieved, then all the fixing steps like welding or epoxy bonding can be performed.

Figure 9:
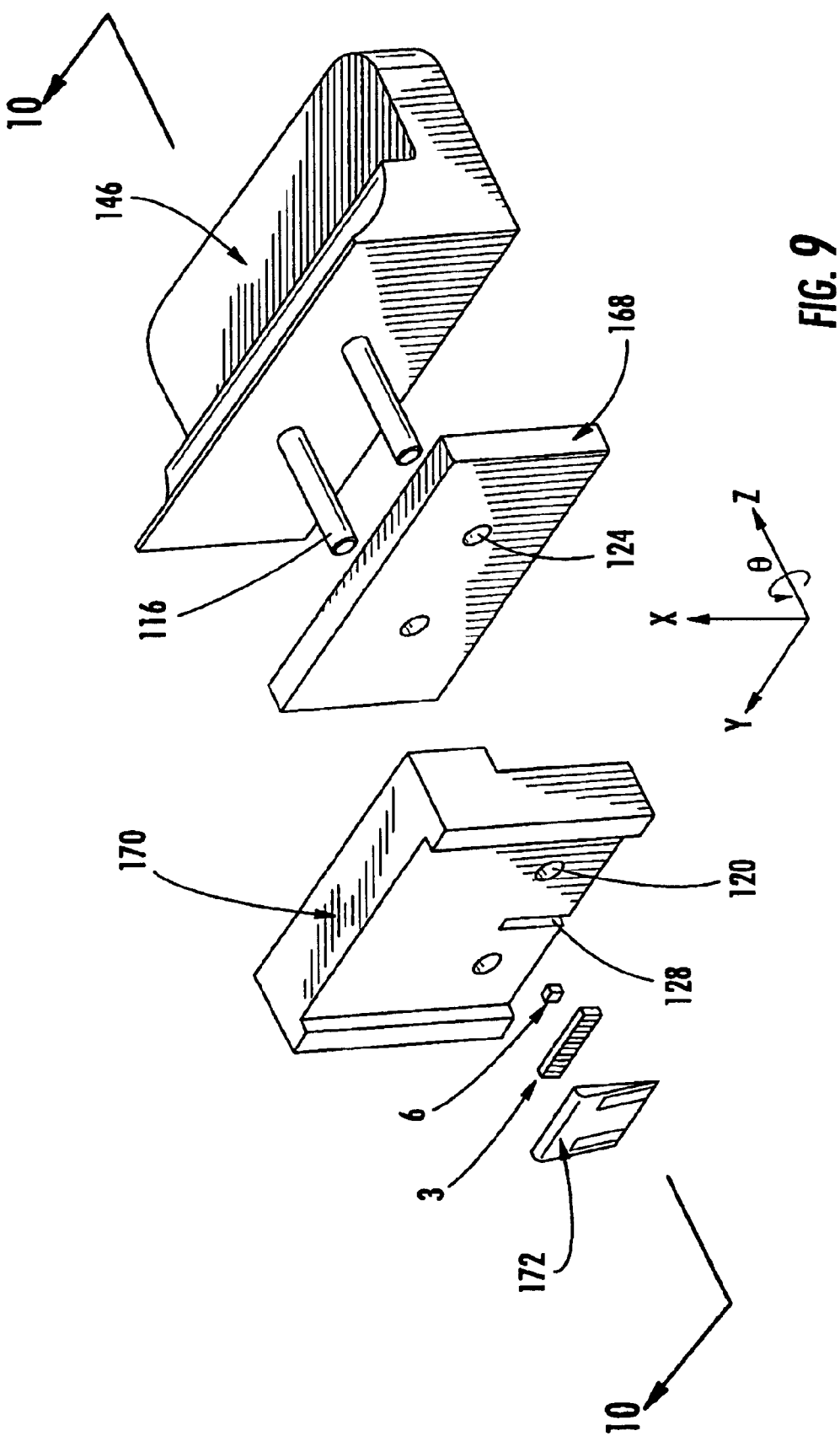
FIG. 9 is a perspective view of another exemplary embodiment of an optical subassembly module according to the present invention.

FIG. 9 is an alternative OSA module with an epoxy layer 172. The epoxy layer may be used to both protect the VCSEL die and to provide an optical interface with an integrated ferrule stop which facilitates good coupling efficiency. In the embodiment of FIG. 9, the same pin plate 146 may be used with a slightly modified weld plate 168 and a slightly modified ceramic substrate 170. The weld plate 168 has been simplified to include a generally rectangular shape having a pair of oversized alignment holes 124. The ceramic substrate 170 is similar to the substrate in FIG. 7, except it includes a notch 128 to enable signals from a bi-direction VCSEL to pass through. In addition, the order of arrangement has been switched. Accordingly, in an exemplary embodiment, the weld plate 168 is positioned adjacent the pin plate 146 and the ceramic substrate 170 is positioned on the other side of the weld plate.

Figure 10:
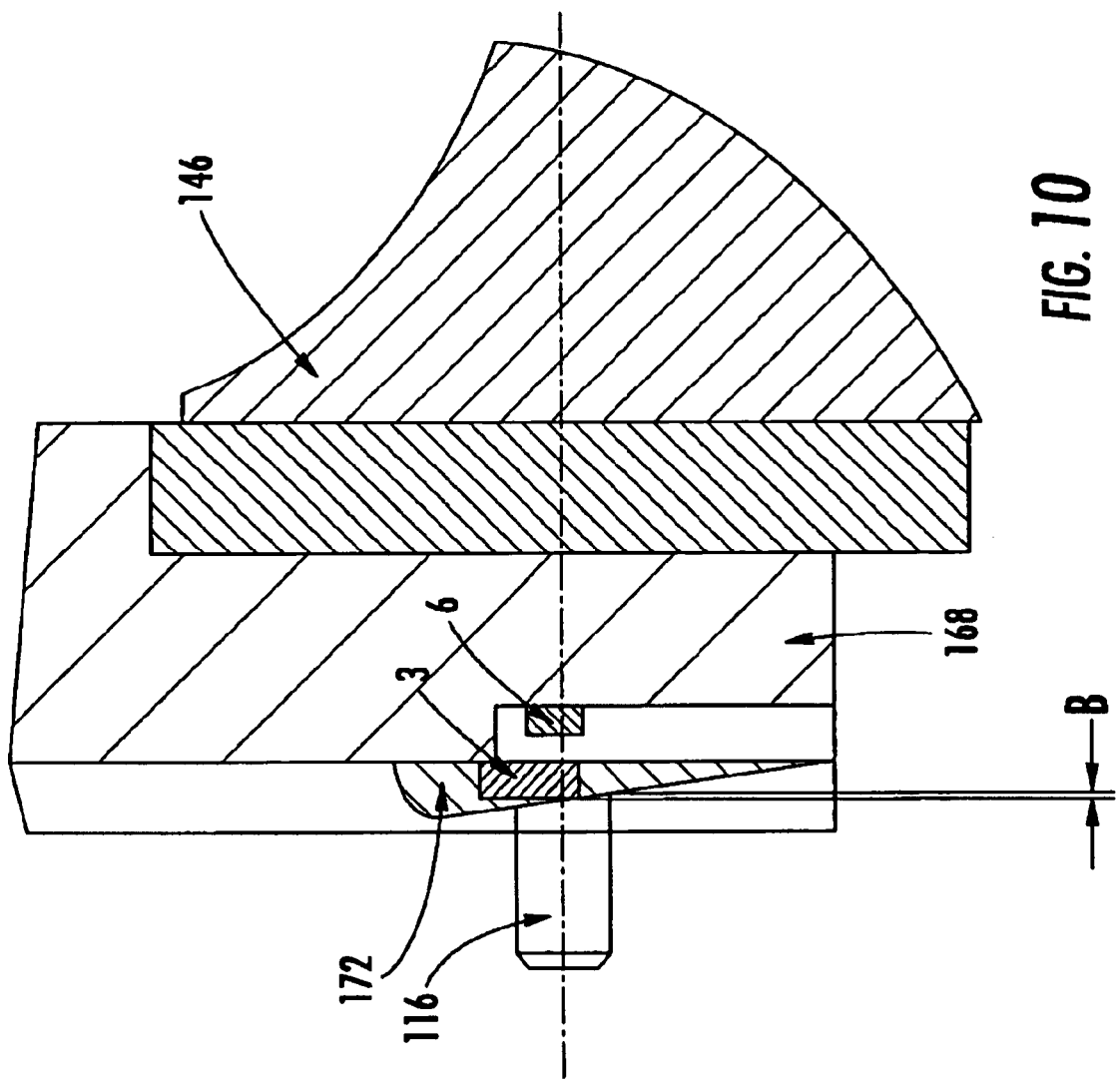
FIG. 10 is a cross-section view of assembled FIG. 9 taken at line B—B.

Referring to FIG. 10, the epoxy layer 172 has a thickness B when measured from the tip of the VCSEL array 3 and the outside surface of the epoxy layer, and when measured at the centerline of the guide pin 116. When the conventional ferrule is coupled to the substrate assembly, this thickness B sets the gap or z distance between the VCSEL array 3 and the fibers in the conventional connector/ferrule (not shown).

Referring again to FIG. 9, the passively aligned substrate, including the VCSEL array 3, the monitor diode 6, the weld plate 168, and the ceramic substrate 170, may be assembled by using a pick-and-place device suce as the FINE-PLACER® machine. The assembly is then slid onto the pin plate 146 by sliding the oversized alignment holes 120 and 124 over the guide pins 116. A conventional MT ferrule is then placed next to the substrate assembly by sliding the conventional connector guide holes over the guide pins 116 until the ferrule reaches a predetermined height defined by necessary assembly tooling. This aligns the ferrule in the z direction. In an exemplary embodiment, active alignment is accomplished by powering up the VCSEL array and monitoring the signals through the output at the other end of the conventional connector. Adjustments in the x, y, and theta directions are then performed (i.e., by moving the substrate assembly and the weld plate about the slack between the guide pins and the alignment holes) while monitoring the signal. Once alignment is achieved (such as when maximum signal strength is recorded for a particular x, y, and/or theta adjustment), the weld plate 168 may be welded to the pin plate 146 to permanently fix the optical subassembly. Although welding is mentioned as an option, other retention means are also contemplated, such as epoxy, detents, fasteners, and the like.

After alignment a volume of epoxy is introduced to the arrangement using any conventional method. The volume of liquid epoxy is formed over VCSEL die 3 and may be positioned using any conventional method. The epoxy may be a UV-curable epoxy, a temperature curable epoxy, a time curable epoxy, or other suitable epoxies. The epoxy is chosen in the exemplary embodiment to form a hard shell that provides mechanical support upon curing. It is a castable epoxy with resistance to pitting and scratching, and it has a low coefficient of expansion. Moreover, the epoxy is chosen to be transmissive to the wavelength of light transmitted either from the optoelectronic device to the optical transmission medium, or vice versa. For example, as used in conjunction with VCSELs and other devices preferred in today's optoelectronics industry, the epoxy may be chosen to be transmissive to 850 nm, 1300 nm or 1550 nm wavelength light. Upon hardening, the epoxy forms a solid encapsulant which may alternatively be referred to as a plastic. As such, the terms epoxy and plastic may be used interchangeably hereinafter in referring to the formed encapsulant.

After the volume of liquid epoxy is placed into position over VCSEL die 3, a molding tool is used to shape the volume of epoxy, which is then cured as necessary, and the molding tool is then removed. It should be emphasized that the pins 116 may be used as mechanical guides which cooperate with features formed on or in a molding tool, and can be used to position said molding tool with respect to VCSEL die 3 along the x, y and z directions. The embodiment shown in FIG. 9 is intended to be exemplary only and, according to other exemplary embodiments, the epoxy layer 172 may be contoured and shaped to include portions that contact the mating surface of a conventional MT in specific ways so as to isolate forces away from the area of the epoxy layer 172 adjacent to the VCSEL die 3. It should be understood that the foregoing embodiments are exemplary only, and that the present invention includes various other configurations which allow for active alignment of an optoelectronic device array by manipulating the array along the x, y and theta directions with respect to the optical ferrule which has already been fixed to the OSA base to which the laser array will be coupled. Various mechanical stops may be used to restrict the relative motion once the components are engaged and globally aligned. The relative translational motion between the components may be provided by any of various configurations such as opposed slidable surfaces. The present invention covers substrate subassemblies including additional or fewer components than shown in the exemplary embodiment of FIG. 1. Various monitoring techniques may be used which provide a monitor capable of receiving a proportional fraction of emitted light from data lasers or extra lasers which may emit in one or both of opposed directions. It should further be understood that the various embodiments may optionally include a connector latch for securely coupling the conventional connector/ferrule to the OSA.

Accordingly, many alterations and modifications may be made by those having ordinary skill in the art without departing from the spirit and scope of the invention. Therefore, it must be understood that the disclosed embodiments have been set forth only for the purposes of illustrations and that they should not be understood to be limiting the invention to what are defined by the foregoing examples.

What is claimed is:

1. An apparatus comprising a substrate assembly including a
   semiconductor substrate having a top and bottom surface, wherein an optoelectronic light-emitting device is disposed on the top surface thereof; and
   a ceramic mounting substrate mounted to said semiconductor substrate, said ceramic mounting substrate having a top and bottom surface, wherein a photodetector device is disposed on the top surface thereof and is capable of detecting light emitted by said optoelectronic device,
   wherein said semiconductor substrate includes a transparent, overhanging pass through portion and a portion of said light-emitting optoelectronic device is disposed on said overhanging portion and said photodetector is disposed below said overhanging portion which permits light emitted by said optoelectronic device to pass through said overhanging portion and be received by said photodetector.

2. The apparatus as in claim 1, further comprising a semiconductor substrate interposed between said semiconductor substrate and said photodetector, said further semiconductor substrate being transparent to said light emitted by said optoelectronic device.

3. The apparatus as in claim 2, in which said optoelectronic device comprises a vertical cavity surface emitting laser.

4. The apparatus as in claim 1, in which said light emitted by said optoelectronic device includes a wavelength being at least 1.25 microns.

5. The apparatus as in claim 1, wherein said pass through portion comprises at least one of a transparent material or notch.

6. An optical subassembly module comprising a base unit having a pair of guide pins passing through a substrate assembly and a ferrule, said substrate assembly including a U-shaped weld plate with a notch therein, said plate having a VCSEL array disposed thereon, and a ceramic substrate having a photodetector device disposed thereon, wherein said plate and ceramic substrate are bonded together and said photodiode is capable of detecting a light wavelength emitted by said VCSEL array that passes through the notch and wherein an optical ferrule is spaced apart from said VCSEL array by a medium that is transparent to said light wavelength.

7. The optical subassembly module of claim 6, wherein said medium is at least one of an epoxy layer, a flip chip lens, and a lens array.

8. The optical subassembly module of claim 6, further comprising a connector latch in mechanical communication with said base unit.

9. The optical subassembly module of claim 6, further comprising a lens frame and an adjustable stop member, said adjustable stop member is configured to adjust a gap between the optical ferrule and a lens array.

10. The optical subassembly module of claim 6, further comprising a VCSEL frame and wherein said VCSEL frame includes a recess for receiving said VCSEL array.

* * * * *